United States Patent [19]
Waddill et al.

[11] 4,011,281
[45] Mar. 8, 1977

[54] POLYETHER THIOUREA EPOXY CURING AGENTS

[75] Inventors: Harold George Waddill; Heinz Schulze, both of Austin, Tex.

[73] Assignee: Texaco Development Corporation, New York, N.Y.

[22] Filed: Mar. 6, 1975

[21] Appl. No.: 555,843

[52] U.S. Cl. .......................... 260/830 S; 260/2 N; 260/47 EN; 260/59 EP; 260/79; 260/552 A; 260/552 R

[51] Int. Cl.$^2$ ..................................... C08G 45/06

[58] Field of Search ............... 260/47 EN, 2 N, 59, 260/552 R, 18 PF, 79, 77.5 CH, 77.5 C, 830 R, 830 S

[56] References Cited
UNITED STATES PATENTS

| | | | |
|---|---|---|---|
| 2,957,844 | 10/1960 | Wesp | 260/47 EN |
| 3,436,359 | 4/1969 | Hubin | 260/77.5 |
| 3,573,256 | 3/1971 | Kudo et al. | 260/552 R |
| 3,591,556 | 7/1971 | Godfrey et al. | 260/47 EN |

*Primary Examiner*—Theodore E. Pertilla
*Attorney, Agent, or Firm*—James L. Bailey; Lee G. Meyer

[57] ABSTRACT

An improved curable epoxy resin composition of a vicinalpolyepoxide and an effective amount of a novel polyether thiourea curing agent is disclosed. The improved curable epoxy resins which are useful as coatings, castings, sealants, and adhesives show improved tensile shear strength, flexural strength, and ultimate elongation. The novel polyether thiourea curing agents of the instant invention are characterized by terminal primary amino groups and are formed by reaction of polyoxyalkylenepolyamines with thiourea, thiourea forming compounds or carbon disulfide.

A preferred curing agent includes a mixture of a novel polyether thiourea formed by reaction of a polyoxypropylenepolyamine having a molecular weight of from about 200–2000 and an effective amount of carbon disulfide; and another known epoxy resin curing agent such as a polyoxyalkylenepolyamine in ratios of from about 5:1 to 1:5 by weight.

4 Claims, No Drawings

POLYETHER THIOUREA EPOXY CURING AGENTS

BACKGROUND OF THE INVENTION

1. Field of the Invention

This invention relates to curable epoxy resins and more particularly to epoxy resins containing certain polyether thioureas having terminal primary amino groups.

2. Prior Art

Epoxy resins constitute a broad class of polymeric materials having a wide range of physical characteristics. The resins are characterized by epoxide groups which are cured by reaction with certain catalysts or curing agents to provide cured epoxy resin compositions with certain desirable properties. The most commonly used curing agents are aliphatic amines such as diethylenetriamine, triethylenetetramine and the like.

Epoxy resin compositions having improved physical properties are obtained by employing polyoxyalkyleneamines, and polyoxyalkylenediamines in particular, as curing agents. However, such epoxy resin compositions require long curing times. It is therefore common to employ with such epoxy resin compositions a co-curing agent such as those described in U.S. Pat. No. 3,549,592.

Also known to be effective as epoxy resin curing agents or co-curing agents are various ureas and substituted ureas, such as those disclosed in U.S. Pat. Nos. 3,294,749; 2,713,569; 3,386,956; 3,386,955; 2,855,372 and 3,639,338. However, for certain resin applications where high tensile shear strength, high flexural strength and a high ultimate elongation is required, none of the above curing agent compositions have been entirely adequate.

It has now been found that certain polyether thioureas having terminal primary amino groups, when employed as epoxy curing agents provide cured epoxy resin compositions exhibiting outstanding physical properties. Specifically, epoxy resin formulated with these curing agents and cured, will provide an epoxy resin with high tensile shear strength, high flexural stength and high ultimate elongation thus alleviating the previously mentioned disadvantages. Such cured epoxy resin compositions are useful as coatings, castings, sealants and adhesives.

SUMMARY OF THE INVENTION

According to the broader aspects of the invention, an improved curable epoxy resin composition includes a vicinalpolyepoxide and an effective amount of a novel curing agent of a polyether thiourea having terminal primary amino groups. The novel polyether urea curing agent can be depicted by the general formula:

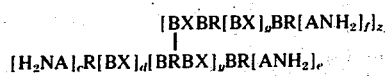

wherein A is a polyoxyalkylene radical containing from about 1 to 15 oxyalkylene groups, B is a polyoxyalkylene amino radical containing from about 1 to 15 oxyalkylene groups, R is a hydrocarbon radical having from 2 to 5 carbon atoms forming from 2 to 4 oxy-carbon linkages with A and B, X is a

radical or a radical derived from a polyether urea-thiourea having at least one

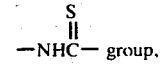

$c$ and $d$ are from 1 to 3 chosen so that their sum is from 2 to 4, $e$ is a number from 1 to 3, $f$ is a number from 1 to 3, $g$ is a number from 1 to 3, $y$ is a number from 0 to about 5, and $z$ is a number from 0 to 2.

According to a preferred embodiment, a curable epoxy resin composition includes an epoxy resin of the diglycidyl either of 4,4'-isopropylidenebisphenol and an effective amount of a curing agent consisting of a mixture of the novel polyether thiourea containing terminal primary amino groups and a polyoxypropylenepolyamine having a molecular weight of from about 200 to 2,000. According to this embodiment, the polyether thiourea containing terminal primary amino groups is formed by reacting a polyoxypropylenepolyamine having a molecular weight of from about 200 to 2,000 and an effective amount of carbon disulfide.

According to another aspect of the invention, the novel polyether thioureas are formed by reacting a suitable polyoxyalkylenepolyamine with a thiourea, a thiourea forming compound or carbon disulfide.

DETAILED DESCRIPTION OF PREFERRED EMBODIMENT

According to a preferred embodiment, a curable epoxy resin contains a diglycidyl ether of 4,4'-isopropylidenebisphenol and an effective amount of a curing agent consisting essentially of a polyether thiourea formed by reacting a polyoxypropylenepolyamine having a molecular weight of about 200 to 2,000 with carbon disulfide; and a polyoxypropylenepolyamine having a molecular weight of from about 200 to 2,000. The curable epoxy resin of this embodiment is prepared essentially in three steps. First, the polyether thiourea having terminal primary amino groups is prepared by charging a suitable reaction vessel with approximately 1.00 mol of a polyoxypropylenepolyamine having a molecular weight of about 400 and consisting substantially of the polyoxypropylenediamine. To the polyoxypropylenepolyamine is added from 0.20 to 0.83 mols of carbon disulfide cooled to about 10° C. The addition is accomplished over a period of from about 40 to 80 minutes. The mixture is then warmed gradually to temperatures of about 25° C, then heated to a temperature of about 100° C until the evolution of hydrogen sulfide has ceased. The resultant reaction mixture is then stripped at temperatures of about 100° C at pressures of 1 mm Hg to form a viscous resinous material.

In the second step, the viscous liquid obtained in step 1 is admixed with a polyoxypropylenepolyamine having a molecular weight of from about 200 to 2,000 in a ratio of from about 5:1 to about 1:5 by weight to produce a curing agent admixture.

In a third step, the admixture obtained in step 2 is added to a suitable amount of a diglycidyl ether of 4,4'-isopropylidene bisphenol such that the total number of equivalent terminal primary amino groups is about equal to the number of equivalents of epoxide in the epoxy resin composition. The epoxy resin and the curing mixture are thoroughly admixed with the addition of about three drops of a silicone fluid to prevent the formation of voids and bubbles. The resulting formulation, after degassing under vacuum for about 2–5 minutes, is oven cured in aluminum molds for about 2 to 5 hours at temperatures from about 80° to 125° C. The cured products exhibit improved tensile shear strength, flexural strength and ultimate elongation.

Generally the polyepoxide containing compositions which can be cured using the novel polyether urea curing agents of this invention are organic materials having a plurality of reactive 1,2-epoxy groups. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

A widely used class of polyepoxides which can be catalyzed according to the practice of the present invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., p-tert-butylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis-(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as α-monothioglycerol, α,α'-dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be cured by means of the above-described curing agents includes the epoxy novolac resins obtained by reacting, preferably, in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K. "Handbook of Epoxy Resins".

It will be appreciated by those skilled in the art that the polyepoxide compositions which can be cured according to the practice of the present invention are not limited to those containing the above described polyepoxides, but that these polyepoxides are to be considered merely as being representative of the class of polyepoxides as a whole.

The novel polyether thiourea curing agent in accordance with the instant invention are those polyethers thioureas having terminal primary amino groups as depicted by the following formula:

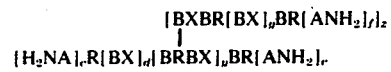

wherein A is a polyoxyalkylene radical containing from about 1 to about 15 oxyalkylene groups wherein each oxyalkylene group contains from 2 to about 4 carbon atoms; R is a hydrocarbon radical containing from 2 to 5 carbon atoms forming from 2 to 4 oxy-carbon linkages with A and B; B is a polyoxyalkylene amino radical containing from about 1 to 15 oxyalkylene groups wherein each oxyalkylene group contains from 2 to about 4 carbon atoms; X is a

radical or a radical derived from a polyether urea-thiourea having at least one

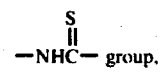

$c$ and $d$ are from 1 to 3 chosen so that their sum is from 2 to 4; $e$ is a number from 1 to 3; $f$ is a number from 1 to 3; $g$ is a number from 1 to 3; $y$ is a number from 0 to 5; $z$ is a number from 0 to 2. It will be realized by those skilled in the art that some terminal groups may be of the form

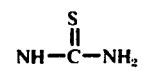

when thiourea is used or

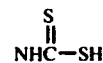

when carbon disulfide is used to supply the C=S radical because of incomplete condensation.

Preferably the polyureas of the instant invention are those depicted by the above formula wherein A corresponds to the formula:

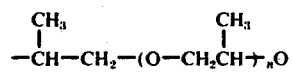

wherein $n$ is a number from 0 to 15 preferably a number from 1 to 10, B corresponds to formula:

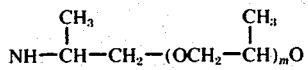

wherein m is a number from 0 to 15 and preferably a number from 1 to 10, c and d are from 1 to 2 chosen so that their sum is from 2 to 3, e is a number from 1 to 2, g is a number from 1 to 2, f is a number from 1 to 2, and z is a number from 0 to 1, y is a number from 1 to 4, and X is a C=S radical.

The most preferred polyether thiourea curing agent is that compound formed by reacting from about 5.0 mols to about 1.2 mols of polyoxypropylenepolyamine having a molecular weight of about 200 to about 400 with 1 mol of carbon disulfide at temperatures from about 50° C to about 150° C. It has been found that addition of greater than about 0.5 moles of carbon disulfide per mole of polyoxyalkylenepolyamine process highly viscous reaction mixtures. Therefore, suitable nondeleterious diluents well known in the art may be utilized to facilitate the reaction when greater than 0.5 moles of carbon disulfide is used per mole of polyoxyalkylenepolyamine.

The polyether ureas of this invention can be formed by reaction of a polyoxyalkylenepolyamine wherein the alkylene contains from 2 to about 4 carbon atoms with thiourea, a thiourea forming compound or carbon disulfide.

A preferred class of polyoxyalkylenepolyamines useful in forming the polyether ureas of the instant invention may be depicted by the formula:

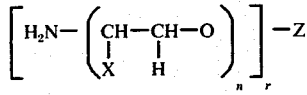

wherein X is a hydrogen, a methyl radical, or an ethyl radical; Z is a hydrocarbon radical having from 2 to 5 carbon atoms forming from 2 to 4 external ether linkages; n is a number from 1 to about 15 and r is a number from 2 to 4. The most preferred polyoxyalkylenepolyamines are the polyoxypropylenediamines wherein X is a methyl radical, n is a number from 1 to 10, Z is a 1,2-propylene radical and r is about 2. These polyoxyalkylenepolyamines can be prepared by known methods as disclosed in U.S. Pat. Nos. 3,236,895 and 3,654,370.

Whenever thiourea is employed as the reactant, the reaction proceeds with the evolution of ammonia and the terminal primary amino group of the polyoxyalkylenepolyamine is converted to a thioureido group. The functionality of the polyoxyalkylenepolyamine is dependent upon the number of terminal primary amino groups. Since thiourea itself is bifunctional, each molecule of thiourea can react with two terminal amino groups of the polyoxyalkylenepolyamine. Consequently, it is possible to form polythioureas in which the polyether thiourea unit repeats in the molecular structure.

Whenever carbon disulfide is employed as the reactant in preparing the compounds of this invention, the reaction proceeds in two steps. The carbon disulfide is initially added to the reaction mixture at temperatures below the boiling point of carbon disulfide, e.g., 40° C. The reaction mixture is then heated to a temperature of from about 50° C to about 150° C until the evolution of hydrogen sulfide ceases. In this reaction one mole of carbon disulfide will react with two moles of the polyoxyalkylenediamine to form the polyether thiourea product.

While carbon disulfide is the preferred reactant, other thiourea forming compounds may be utilized within the scope of the invention to supply the linking

radical. Since the polyoxyalkylenepolyamine reactant already contains terminal primary amino groups, compounds such as dithioisocyanate, and thiophosgene can be used to supply the

radical to form thiouredio linkages.

Another class of polyether thioureas which are useful in the practice of this invention, is a mixed polyether ureathiourea compound of the formula:

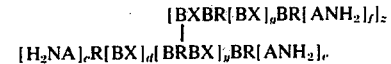

wherein A is a polyoxyalkylene radical containing from about 1 to 15 oxyalkylene groups, B is a polyoxypropylene amino radical containing from about 1 to 15 oxyalkylene groups, R is a hydrocarbon radical having from 2 to 5 carbon atoms forming from 2 to 4 oxy-carbon linkages with A and B; X is a C=O radical or a

radical; c and d are from 1 to 3 chosen so that their sum is from 2 to 4; e is a number from 1 to 3, f is a number from 1 to 3, g is a number from 1 to 3, y is a number from 0 to about 5, and z is a number from 0 to 2.

Thus in accordance with this aspect of the invention

radicals and

radicals are interspersed throughout the polyether chain to yield a mixed polyether urea-thiourea compound. The polyether urea moity of the mixed compound as well as polyether ureas in general are more fully described in copending application, Ser. No. 555,844, filed of even date. Generally, these polyether ureas having terminal primary amino groups are formed by reaction of polyoxyalkylenediamine of the type herein described with urea, a urea forming compound or with a bifunctional isocyanate.

While it is satisfactory to employ the polyether thiourea curing agents of the instant invention as the sole curing agent in the epoxy resin composition, in one modification of this invention these polyether thiourea curing agents are preferably employed in combination with an amine curing agent conventionally employed in curing epoxy resin compositions. Suitable amino co-curing agents include aliphatic polyamines, such as diethylenetriamine and triethylenetetramine; and aromatic polyamines such as methylenedianiline, etc. Polyoxyalkylenediamines of the type hereinbefore described are preferable co-curing agents. It has been found that ratios of polyether thiourea to amine co-curing agent of from about 5:1 to about 1:5 produce cured epoxy resin composition with significantly improved properties, for example, tensile shear strength, flexural strength and ultimate elongation.

The amount of polyether thiourea or polyether thioureaamine curing agent admixture which is employed in curing polyepoxide compositions will depend on the amine equivalent weight of the curing agent employed. The total number of equivalents of amine group is preferably from about 0.8 to about 1.2 times the number of epoxide equivalents present in the curable epoxy resin composition with a stoichiometric amount being most preferred.

Various conventionally employed additives can be admixed with these catalyzed polyepoxide-containing compositions prior to final cure. For example, in certain instances it may be desired to add minor amounts of other co-catalysts, or hardeners, along with the curing agent systems herein described. Conventional pigments, dyes, fillers, flame-retarding agents and other compatible natural and synthetic resins can also be added. Furthermore, known solvents for the polyepoxide materials such as acetone, methyl ethyl ketone, toluene, benzene, xylene, dioxane, methyl isobutyl ketone, dimethylformamide, ethylene glycol monoethyl ether acetate, and the like, can be used if desired, and where necessary.

The polyether thiourea catalyzed polyepoxide-containing compositions can be used in any of the applications for which polyepoxides are customarily used, e.g., as adhesives, impregnants, surface coatings, potting and encapsulating compositions, in laminates and, particularly, as adhesives for bonding metallic elements or structures together.

The use of polyether thioureas having terminal amino groups of this invention will now be further illustrated in the following examples which are for purposes of illustration and should not be considered a limitation of the scope of the invention.

EXAMPLE 1

Into a reaction vessel containing 824 g. (1.89 mol) of a polyoxypropylenediamine having a molecular weight of approximately 436 was added 23 ml (0.38 mol) of carbon disulfide at a temperature of 10° C. The carbon disulfide was added below the surface of the liquid in the reaction vessel over a period of 70 minutes. Over the next hour, the contents of the reaction vessel were warmed up to 25° C. and then the mixture was heated at 100° C. for 30 minutes until the evolution of hydrogen sulfide ceased. The reaction mixture was then stripped at 100° C. at a pressure of 1 mm Hg. The polyether thiourea obtained had an osmometric molecular weight of 522 and analyzed as follows: 0.67% N, 3.38 meq primary amine/g.

EXAMPLE 2

In this example a mixed polyether urea-thiourea compound was prepared in accordance with the instant invention. This preparation was accomplished in three steps. First, a polyether urea having terminal primary amino groups was prepared by reacting 2,916 (12.0 moles, 8.23 meq primary amine/g.) of a polyoxypropylenepolyamine having a molecular weight of about 240 sold by Jefferson Chemical Company, Austin, Tex. 78751 under the name "JEFFAMINE D-230" with 360 g. (6.0 moles) of urea at a temperature of 198° C. until the evolution of ammonia has ceased.

In a second step, 702 g (about 1.5 moles) of the polyether urea prepared in the first step was brought to a temperature of about 20° C and 46 ml (0.75 moles) of carbon disulfide was added over a period of 65 minutes. At the end of the carbon disulfide addition, the temperature of the reaction mixture had increased to about 95° C. The reaction mixture was then heated to a temperature of about 100° C. where it was maintained for about 100 minutes.

In the final step, the reaction mixture obtained in step 2 was stripped in a rotary evaporator at 0.7 mm Hg (bath temperature 100° C.) to yield a mixed polyether urea-thiourea compound having terminal primary amino groups. The mixed compound showed an osmometric molecular weight of 930 and analyzed as follows: 1.99 meq primary amine/g.

To illustrate the advantage of the polyether thiourea curing agents of this invention, various epoxy formulations employing diglycidylether of 4,4'-isopropylidene bisphenol were cured with various polyoxypropylenediamines and various of the curing agents of this invention. Three drops of silicone fluid were added to each formulation to prevent formation of voids and bubbles. After degassing under vacuum, the formulations were oven-cured at the conditions indicated in aluminum molds. The cured products were subjected to standard American Society for Testing Materials (ASTM) tests for Izod impact strength (ASTM designation D-256), flexural strength and modulus of elasticity in flexure (ASTM designation D-790-66), tensile strength and elongation at break (ASTM designation D-638-64 T), deflection temperature (ASTM designation D-648-56) and hardness (ASTM designation D-2240-64 T). The tensile shear strength (ASTM D-1002-64) was measured on adhesive bonds. The abbreviations in the tables, pbw, psi and g. stand for parts by weight, pounds per square inch and grams, respectively.

EXAMPLES 3–6

In these examples epoxy castings were prepared employing the polyether thiourea curing agent of Example 1 as the sole curing agent and in combination with a polyoxypropylenepolyamine having a molecular weight of 400 sold under the name JEFFAMINE D-400 by Jefferson Chemical Co., Austin, Tex. 78751 as a co-curing agent. For comparative purposes an epoxy casting was cured with the JEFFAMINE D-400 as the sole curing agent (Example 6) to demonstrate the improved properties of the epoxy castings cured with the polyether thioureas of this invention. The data are presented in the following Table I.

TABLE I

| Example No. | 3 | 4 | 5 | 6 |
|---|---|---|---|---|
| Polyepoxide,[1] pbw | 100 | 100 | 100 | 100 |
| Curing Agent | | | | |
| Polyether thiourea [2]/ polyoxypropylene-polyamine [3] | 100/0 | 80/20 | 50/50 | 0/100 |
| Equiv. wt. of Blend | 148 | 137 | 122 | 105 |
| pbw | 78 | 72 | 64 | 50 |
| Physical Properties of Cured Casting [4] | | | | |
| IZOD Impact Strength, ft. lbs/in | 2.02 | 1.49 | 1.20 | 0.53 |
| Tensile Strength, psi | 5,250 | 6,860 | 7,560 | 8,310 |
| Tensile Shear, psi | 3,110 | 3,970 | 3,270 | 1,430 |
| Tensile Modulus, psi × $10^{-5}$ | 2.82 | 3.40 | 3.72 | 4.21 |
| Ultimate Elongation, % | 21 | 5.5 | 6.2 | 3.5 |
| Flexural Strength, psi | 8,810 | 11,500 | 13,280 | 13,300 |
| Flexural Modulus, psi × $10^{-5}$ | 2.72 | 3.77 | 4.09 | 4.58 |
| Deflection Temp., °C, 264 psi/66 psi | 29/33 | 40/42 | 43/46 | 45/48 |
| Hardness, 0–10 sec. Shore D | 81–76 | 84–80 | 84–80 | 85– |

[1] Diglycidylether of 4,4'-isopropylidene bisphenol
[2] Polyether thiourea of Example 1
[3] A polyoxypropylenediamine of approximately 400 molecular weight sold by Jefferson Chemical Company, Austin, Texas 78751 under the name "JEFFAMINE D-400"
[4] Cured 2 hours at 80° C, 3 hours at 125° C

EXAMPLES 7–9

In these examples epoxy castings were prepared employing the polyether thiourea curing agents prepared in accordance with Example 2 as the sole curing agent and in various combinations with a polyoxypropylenepolyamine having a molecular weight of about 400 sold by Jefferson Chemical Co., Austin, Tex. 78751 under the name JEFFAMINE D-400 as a co-curing agent. The excellent physical properties of these castings are presented in the following Table II. Also listed in the table for comparative purposes are the data of Example 6, which is an epoxy casting cured solely with JEFFAMINE D-400.

TABLE II

| Example No. | 7 | 8 | 9 | 6 |
|---|---|---|---|---|
| Polyepoxide,[1] pbw | 100 | 100 | 100 | 100 |
| Curing Agent | | | | |
| Polyether thiourea [2]/ polyoxypropylene-polyamine [3] | 100/0 | 50/50 | 20/80 | 0/100 |
| Equiv. wt. of Blend | 252 | 147 | 119 | 105 |
| pbw | 132 | 77 | 62 | 50 |
| Physical Properties of Cured Casting [4] | | | | |
| IZOD Impact Strength, ft. lbs/in | — | 1.15 | 1.20 | 0.53 |
| Tensile Strength, psi | — | 8,650 | 7,790 | 8,310 |
| Tensile Shear, psi | 4,390 | 4,820 | 4,260 | 1,430 |
| Tensile Modulus, psi × $10^{-5}$ | — | 4.18 | 4.10 | 4.21 |
| Ultimate Elongation, % | — | 6.3 | 5.0 | 3.5 |
| Flexural Strength, psi | — | 14,420 | 13,160 | 13,300 |
| Flexural Modulus, psi × $10^{-5}$ | — | 4.49 | 4.18 | 4.58 |
| Deflection Temp., °C, 264 psi/66 psi | — | 49/52 | 44/45 | 45/48 |
| Hardness, 0–10 sec. Shore D | — | 83–80 | 84–80 | 85– |

[1] Diglycidylether of 4,4'-isopropylidene bisphenol
[2] Polyether thiourea of Example 2
[3] A polyoxypropylenediamine of approximately 400 molecular weight sold by Jefferson Chemical Company, Austin, Texas 78751 under the name "JEFFAMINE D-400"
[4] Cured 2 hours at 80° C, 3 hours at 125° C

EXAMPLE 10

In this example, a polyether thiourea curing agent was prepared in accordance with the invention by reacting a polyoxyethylenepolyamine with carbon disulfide. A suitable reaction vessel fitted with a stirrer was charged with 650 g. (1.0 moles) of a polyoxyethylenepolyamine having terminal primary amino groups and having a molecular weight of approximately 650, sold under the name JEFFAMINE ED 600 by Jefferson Chemical Co., Austin, Tex. 78751 and cooled to 15° to 28° C. The stirrer was energized and 36 ml (0.6 moles) of carbon disulfide was added to the charged vessel over a 30 minute period. After the carbon disulfide addition, the reaction mixture was stirred at 28°–33° C for about 1 hour. The stirred reaction mixture was then heated to 100° C and held at that temperature until the emission of hydrogen sulfide had ceased. The reaction mixture was then stripped at 100° C/0.5 mm Hg. A viscous liquid polyether thiourea having terminal primary amino groups was obtained. The liquid polyether thiourea had an osmometric molecular weight of 1,050 which upon analysis showed the following: total amine 1.31 meq./g., primary amine 1.18 meq./g., and S 2.8 wt.%

EXAMPLES 11–14

In these examples, epoxy castings were prepared employing the polyether thiourea curing agent prepared in accordance with Example 10 with a polyoxypolyamine co-curing agent. The physical properties of these epoxy castings are presented in Table III.

TABLE III

| Example No. | 11 | 12 | 13 | 14 |
|---|---|---|---|---|
| Polyepoxide,[1] pbw | 100 | 100 | 100 | 100 |
| Curing Agent | | | | |
| Polyether thiourea [2]/ polypropylene-polyamine [3] | 70/30 | 50/50 | 20/80 | 0/100 |
| Equiv. wt. of Blend | 145 | 102 | 70 | 64 |
| pbw | 78 | 55 | 38 | 30 |
| Physical Properties of Cured Casting [4] | | | | |
| IZOD Impact Strength, ft. lbs/in | 6.01 | 1.54 | 1.12 | 1.42 |
| Tensile Strength, psi | 1,860 | 7,890 | 9,480 | 10,300 |
| Tensile Shear, psi | 2,460 | 4,500 | 4,100 | 1,130 |
| Tensile Modulus, psi × $10^{-5}$ | 0.32 | 0.38 | 0.41 | 3.91 |
| Ultimate Elongation, % | 72 | 4.8 | 9.4 | 5.0 |
| Flexural Strength, psi | 770 | 13,900 | 15,720 | 16,900 |
| Flexural Modulus, psi × $10^{-5}$ | 0.38 | 4.01 | 4.28 | 4.71 |
| Hardness, 0–10 sec. Shore D | 64–52 | 80–76 | 85–82 | 88– |

[1] Diglycidyl ether of 4,4'-isopropylidene bisphenol
[2] The polyether urea of Example 10
[3] A polyoxypropylenepolyamine having an equivalent weight of 58 and molecular weight of about 240, sold under the name JEFFAMINE D-230, by Jefferson Chemical Co., Inc., Austin, Texas 78751
[4] Cure cycle: 2 hours, 80° C; 3 hours, 125° C While the invention has been explained in relation to its preferred embodiment, it is to be understood that various modifications thereof will become apparent to those skilled in the art upon reading the specification and is intended to cover such modifications as fall within the scope of the appended claims.

What is claimed is:

1. A curable epoxy resin composition consisting essentially of:
    a vicinal polyepoxide; and an effective amount of a polyether thiourea curing agent having terminal primary amino groups and being formed by the reaction of a compound selected from a group consisting of thiourea, thiourea forming compounds and carbon disulfide with a polyoxyalkylenepolyamine of the formula

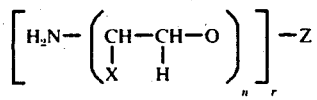

wherein X is a hydrogen or methyl radical, Z is a hydrocarbon radical having 2 to 5 carbon atoms forming from 2 to 4 external ether linkages, $n$ is a number from 1 to about 15 and $r$ is a number from 2 to 4 wherein the molar ratio of said compound to said polyoxyalkylenepolyamine is from 0.20 to 0.83, wherein X is a hydrogen the molecular weight is approximately 650 and wherein X is a methyl radical the molecular weight is from about 200 to 2,000.

2. The curable epoxy resin composition of claim 1 wherein said polyether thiourea curing agent is employed in combination with an effective amount of a co-curing agent selected from a group consisting of aliphatic polyamines, aromatic polyamines and polyoxyalkylenepolyamines.

3. The curable epoxy resin composition of claim 2 wherein said co-curing agent is a polyoxyalkylenepolyamine and is present in an amount of from about 5:1 to 1:5 by weight of said polyether thiourea curing agent.

4. The curable epoxy resin of claim 1 wherein the molar ratio of said compound to said polyoxyalkylenepolyamine is from 0.20 to 0.6.

* * * * *